Dec. 22, 1931.  J. H. LEWIS  1,837,455
REENFORCED GLASS AND PROCESS OF MAKING THE SAME
Filed Sept. 18, 1930
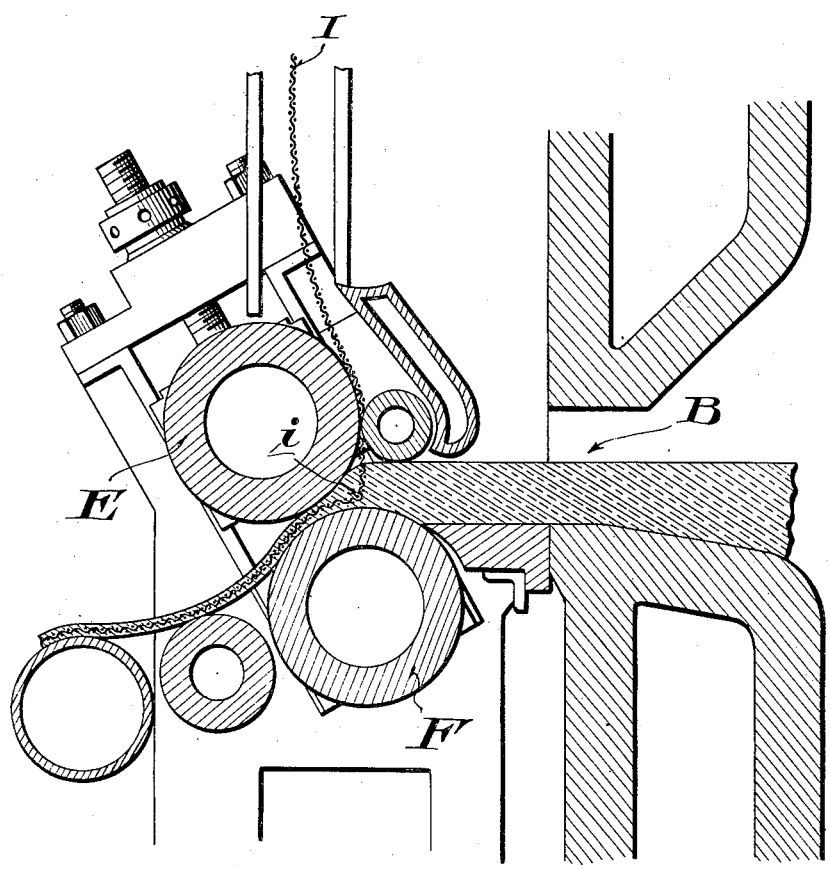
Inventor
JOSEPH H. LEWIS
By Dorsey Cole
Attorneys Patented Dec. 22, 1931

1,837,455

UNITED STATES PATENT OFFICE

JOSEPH H. LEWIS, OF KINGSPORT, TENNESSEE, ASSIGNOR TO BLUE RIDGE GLASS CORPORATION, OF KINGSPORT, TENNESSEE

REENFORCED GLASS AND PROCESS OF MAKING THE SAME

Application filed September 18, 1930. Serial No. 482,870.

A serious defect in armored glass, i. e., sheet glass having embedded therein a trellis (or separate strands) of wire, has been that bubbles are formed in the glass around the wire, tending both to weaken the sheet and to mar its appearance. These bubbles are due to gases entrapped in the sheet in the process of manufacture and to gases liberated from the wire under the influence of heat. Iron wire, which has generally been used, oxidizes during the period preceding its sealing in the glass, this oxidization being accelerated immediately preceding its enclosure due to the heating of the wire from the glass as the wire is fed thereto. The resulting bubbles have restricted the manufacture of wire glass to processes in which the glass is cooled to a greater or less extent before the wire is fed thereto, as in the so-called "sandwich" process in which two preformed sheets are brought together with the wire between them, or when processes involving hotter glass are employed, to cases in which the wire is guarded against heat until it is brought to its final position.

I overcome the defects above noted by plating the wire with chromium, and preheating such plated wire before it is sealed in place, the preheating being in order to eliminate, prior to that time, the gases trapped in and on the wire in the process of plating. This heating may and is, by preference, accomplished by the heat of the glass in which the plated wire is to be sealed, and when heating in this manner is relied on the process of fabricating the sheet should be one in which the glass is hot at the time the wire is fed thereto, such as in the so-called "continuous" processes in which the glass is delivered from a melting furnace directly to a forming pass, through which the wire is also fed.

A machine suitable for carrying out such a process is shown in the accompanying drawing. In this machine, which is of the type shown in the copending application of Pond and Lewis, Serial No. 382,391, glass issues from the furnace through the throat B and flows to the forming pass located between the rollers E and F. A wire trellis I, which has been chromium plated, is fed to the forming pass along with the molten glass and is embedded in the sheet as formed in the pass.

With the use of plated wire, as herein described, it will be found that the wire will be so heated by the molten glass, prior to entering the latter, and that gases trapped on the wire as the result of plating, or gases resulting from decomposition of compounds present on the wire after plating, are driven off and liberated prior to the immersion of the wire in the glass, and that as a result a sheet is produced substantially free from bubbles around the wire. Also, by the use of chromium plated wire, the formation of iron oxides is prevented during the period immediately preceding the sealing in. In the continuous process, it has been noted that the rate of formation of iron oxides is rapid enough to impart very undesirable color streaks to the glass accompanied by a great many gas bubbles.

The indications of numerous experiments are that, contrary to what might be expected, chromium plated wire is wetted by the glass and that as a result thereof a more perfect adhesion between the wire and the glass results than occurs in the case of iron wire embedded in glass, this tending to increase the strength of the sheet. The chromium plating may be carried out in any approved way, the coating being thin.

Having thus described my invention what I claim as new and desire to secure by U. S. Letters Patent, is:

1. The hereinbefore described process of manufacturing sheet glass which comprises preheating chromium plated wire, introducing the heated wire into molten glass adjacent to a forming pass and passing the wire through the pass with glass to form a sheet.

2. The hereinbefore described process of manufacturing sheet glass which comprises passing molten glass through a forming pass, introducing chromium plated wire into the glass immediately in front of the forming pass and exposing it to the heat of the glass prior to such introduction to heat the wire, and passing the heated wire through the pass with the glass.

3. A glass sheet having embedded therein chromium plated wire.

In testimony whereof I hereunto affix my signature.

JOSEPH H. LEWIS.